United States Patent [19]

Ishizaka et al.

[11] Patent Number: 5,064,014
[45] Date of Patent: Nov. 12, 1991

[54] METHOD OF CONTROLLING POWER STEERING SYSTEM

[75] Inventors: Kouichi Ishizaka; Yukihisa Kosugi, both of Saitama, Japan

[73] Assignee: Jidosha Kiki Co., Ltd., Tokyo, Japan

[21] Appl. No.: 432,783

[22] Filed: Nov. 6, 1989

[30] Foreign Application Priority Data

Nov. 14, 1988 [JP] Japan .................................. 63-285858

[51] Int. Cl.⁵ .................................................. B62D 6/02
[52] U.S. Cl. .................................. 180/79.1; 180/143; 364/424.05; 364/565
[58] Field of Search ...................... 180/143, 142, 79.1; 364/565, 424.05, 426.02

[56] References Cited

U.S. PATENT DOCUMENTS 4,793,433 12/1988 Emori et al. ........................ 180/143
4,803,629 2/1989 Noto et al. ......................... 180/79.1
4,954,957 9/1990 Kanagoe et al. .................... 180/79.1

FOREIGN PATENT DOCUMENTS 77967 5/1984 Japan ..................................... 180/143

Primary Examiner—Mitchell J. Hill
Attorney, Agent, or Firm—Blakely, Sokoloff, Taylor & Zafman

[57] ABSTRACT

In a method of controlling a power steering system, which controls a steering force in accordance with an engine revolution when no vehicle velocity signal is supplied, after the engine revolution becomes a first predetermined value or more, and subsequently becomes a second predetermined value or less and a third predetermined value or more, the steering force is controlled in accordance with the engine revolution.

2 Claims, 3 Drawing Sheets

5,064,014

METHOD OF CONTROLLING POWER STEERING SYSTEM

BACKGROUND OF THE INVENTION

The present invention relates to a method of controlling a power steering system and, more particularly, to control of a power steering force when no vehicle velocity signal is supplied.

FIG. 3a is a timing chart showing changes in engine revolution as a function of time. After an engine is started, in order to perform warm-up operation, the engine revolution is increased from 1,200 rpm at time t1 to 2,400 rpm at time t2. Upon sufficient warm-up operation, the engine revolution is decreased from 2,400 at time t3 to 1,200 rpm at time t4. The engine revolution changes in accordance with a vehicle velocity on and after time t5 when the vehicle starts to travel. In FIG. 3a, after the vehicle velocity reaches 1,500 rpm at time t6, it increases close to 2,400 rpm and decreases at times t7 and t8. After time t9, the vehicle velocity increases at times t10 and t11. The engine revolution generally exceeds 1,500 rpm as indicated at time t10. The colder the weather, the larger the increase in engine revolution for warm-up operation.

In a conventional method of controlling a power steering system, while a vehicle velocity signal is supplied, a steering force is controlled in accordance with a vehicle velocity. However, when no vehicle velocity signal is supplied, a steering force is controlled in accordance with an engine revolution, as shown in FIGS. 3b and 3c. More specifically, a solenoid current is controlled in accordance with an engine revolution as follows. While the engine revolution is low, the solenoid current is set to be large. While the engine revolution is high, the solenoid current is set to be small. When the solenoid current is large, a required steering force is small, and hence the steering wheel feels light.

FIGS. 3b and 3c show solenoid currents. FIG. 3b shows a case wherein the solenoid current is controlled in accordance with an engine revolution when the engine revolution exceeds 2,400 rpm. A drawback of this control is that the steering wheel feels heavy only at a high vehicle velocity but does not feel heavy at an intermediate vehicle velocity. FIG. 3c shows a case wherein the solenoid current is supplied in accordance with an engine revolution when the engine revolution exceeds 1,200 rpm. A drawback of this control is that the steering feel feels heavy during an idling period (times t2 to t3).

As described above, in the conventional method of controlling a power steering system, since the engine revolution increases during warm-up operation prior to vehicle travel, the steering wheel feels heavy during this period.

SUMMARY OF THE INVENTION

The present invention has been made in consideration of such a situation, and has as its object to provide a method of controlling a power steering system which allows a steering wheel to feel light during warm-up operation prior to vehicle travel even if an engine revolution increases.

In order to achieve the above object, according to the present invention, there is provided, a method of controlling a power steering system, which controls a steering force in accordance with an engine revolution when no vehicle velocity signal is supplied, wherein after the engine revolution becomes a first predetermined value or more, and subsequently becomes a second predetermined value or less and a third predetermined value or more, the steering force is controlled in accordance with the engine revolution.

In the method of controlling a power steering system according to the present invention, the minimum power steering force is set and the steering wheel feels lightest prior to vehicle travel.

DETAILED DESCRIPTION OF THE PREFERRED EMBODIMENT

Figure 1:
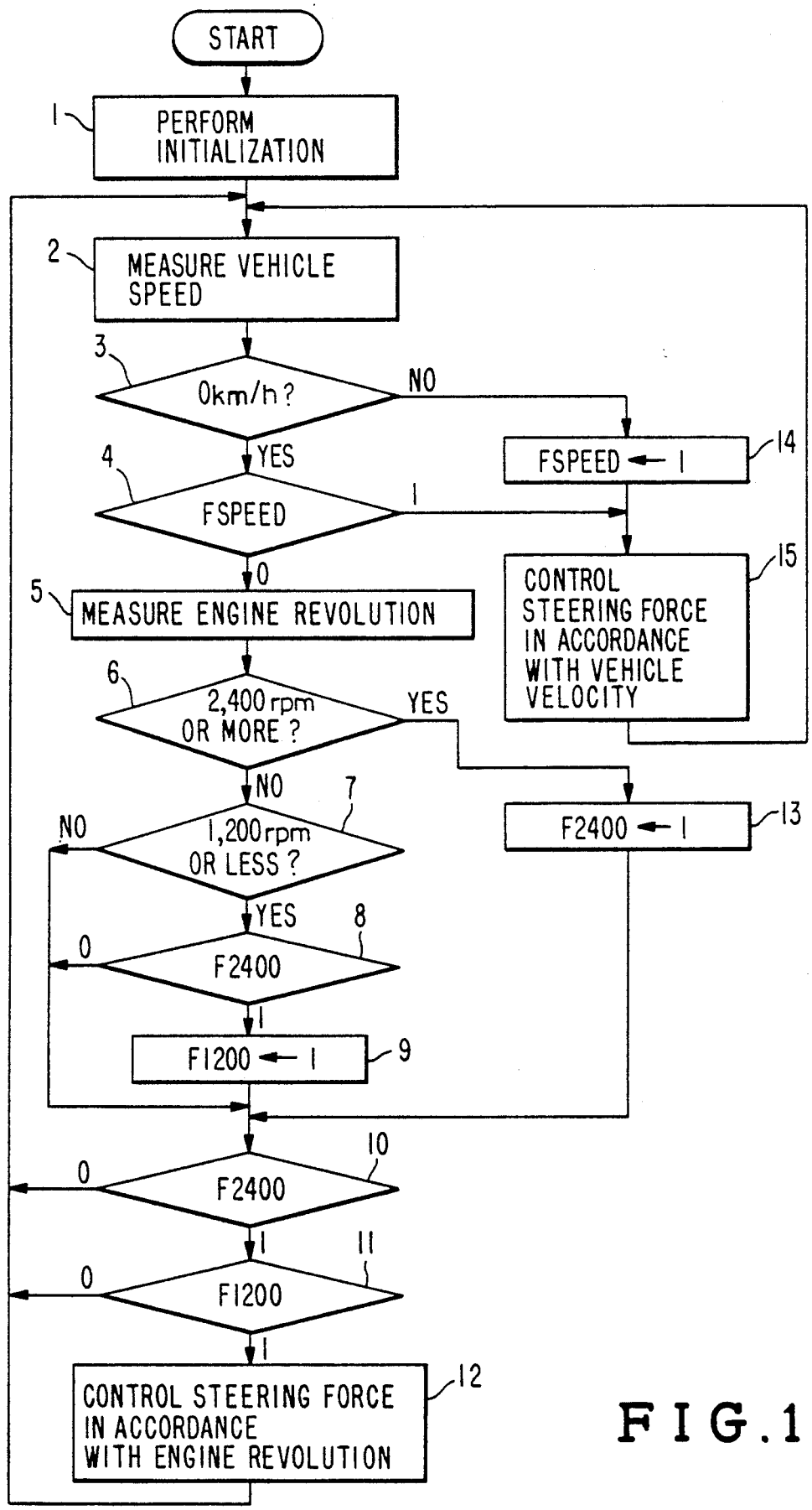
FIG. 1 is a flow chart for explaining a method of controlling a power steering system according to an embodiment of the present invention.
Figure 2:
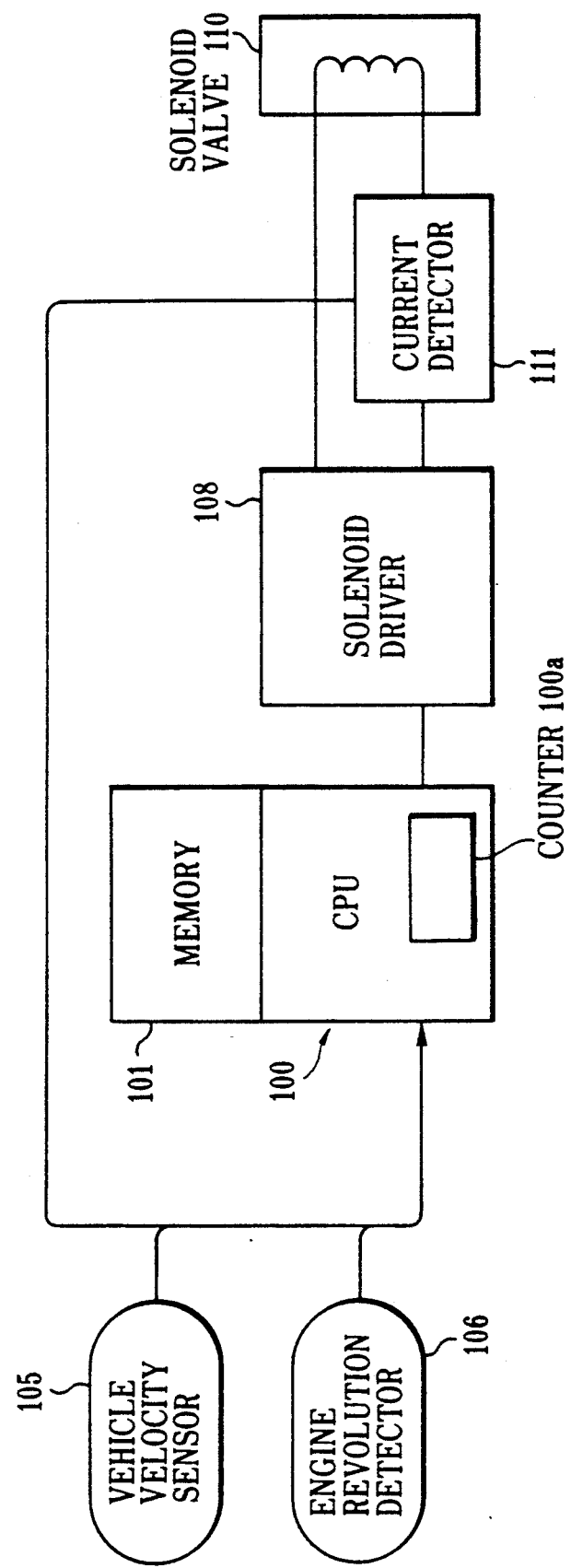
FIG. 2 is a block diagram showing a basic arrangement of a control device of a power steering system to which the present invention is applied.
Figure 3A:
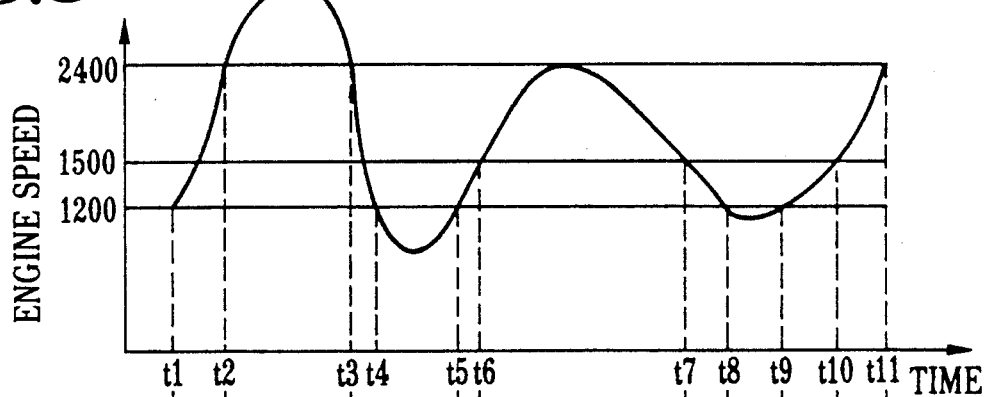
FIG. 3a is a timing chart showing engine revolution vs. time characteristics.
Figure 3B:
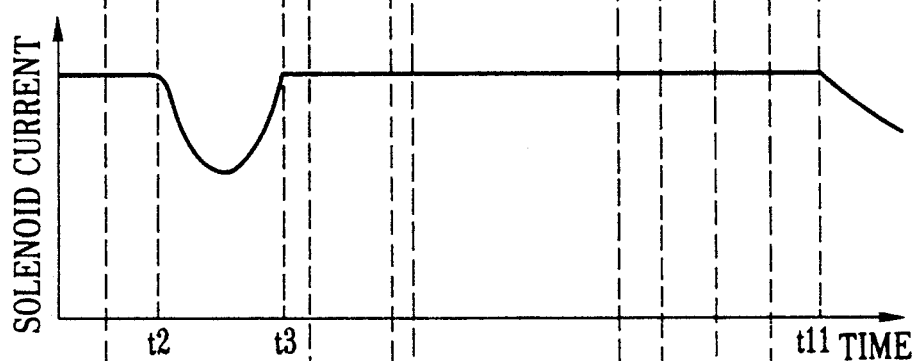
FIGS. 3b and 3c are timing charts respectively showing solenoid currents in conventional methods.
Figure 3C:
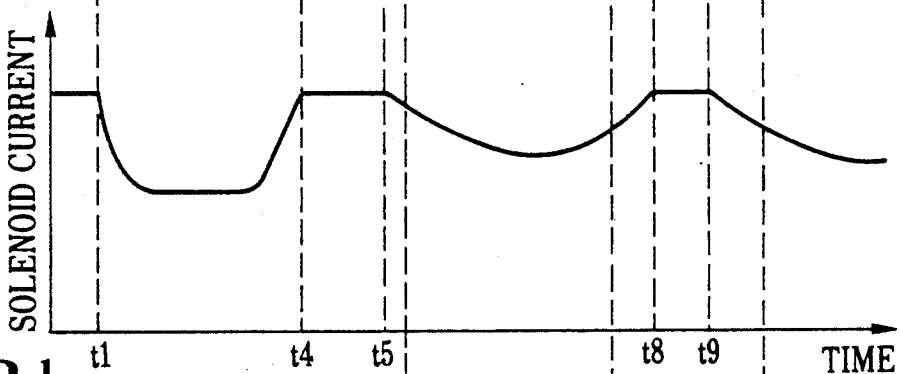
Figure 3D:
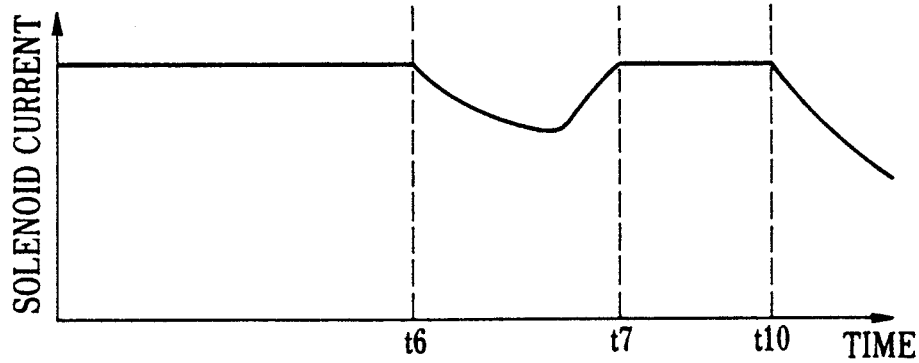
FIG. 3d is a timing chart showing a solenoid current in the method according to the embodiment of the present invention.

FIGS. 1, 2, and 3d are views for explaining a method of controlling a power steering system according to an embodiment of the present invention. FIG. 2 shows a basic arrangement of a control device of a power steering system to which the present invention is applied. A vehicle velocity sensor 105 for detecting a vehicle velocity and an engine revolution detector 106 for detecting an engine revolution from an ignition pulse are connected to a CPU 100 as a controller. A memory 101 is connected to the CPU 100 so as to store programs necessary for control to be described below and necessary data. In addition, a solenoid driver 108 is connected to the CPU 100. The solenoid driver 108 serves to drive a solenoid valve 110 having a known control mechanism (not shown) of the power steering system. A solenoid current detector 111 for supplying a solenoid current to the CPU 100 is arranged at the output side of the solenoid driver 108.

Flags FSPEED, F2400, and F1200 in the memory 101 and a counter 100a are initialized to zeros (step 1). The memory 101 and the counter 100a are arranged in the CPU 100. The CPU 100 measures a vehicle velocity on the basis of a signal from the vehicle velocity sensor 105 (step 2) and checks whether the vehicle velocity is 0 km/h (step 3). If YES in step 3, the flow advances to step 4.

In step 4, the CPU 100 checks whether the flag FSPEED is "1" or "0". Since the flag FSPEED is "0" in this case, the CPU 100 measures an engine revolution N on the basis of an output from the engine revolution detector 106 (step 5). This operation means that a steering power is not controlled by the vehicle velocity but is controlled by the engine revolution N. In step 6, the CPU 100 checks whether $N \geq 2,400$ rpm. Since the engine revolution N is low at first, the flow advances to step 7. In step 7, the CPU 100 checks whether $N \leq 1,200$ rpm. Since $N \leq 1,200$ rpm at first, the flow advances to step 8. In step 8, the CPU 100 checks whether the flag F2400 is "1" or "0". Since the flag F2400 is "0" in this case, the flow advances to step 10.

Steps 2 to 7, and 10 are repeated while 2400 rpm > N > 1200, rpm.

If N ≧ 2,400 rpm in step 6, the flow advances to step 13 to set "1" in the flag F2400, and the flow advances to step 10. Since the flag 2400 is "1", the flow advances to step 11. Since the flag F1200 is "0", the flow returns to step 2. The flow reaches step 6 again because no vehicle velocity signal is supplied from the vehicle velocity sensor 105 yet. While N ≧ 2,400 rpm, steps 2 to 6, 13, 10, and 11 are repeated.

If N < 2,400 rpm in step 6, the flow advances to step 10 through step 7. While 1,200 rpm < N < 2,400 rpm, steps 2 to 7, 10, and 11 are repeated.

If N < 1,200 rpm in step 7, the flow advances from step 7 to step 9 through step 8 so as to set "1" in the flag F1200. With this operation, the flow advances to step 12 through steps 10 and 11. In step 12, the counter 100a is incremented or decremented in accordance with the engine revolution N. Since N ≦ 1,500 rpm in this case, the counter 100a is decremented. However, since the counter 100a has been initialized to "0", "0" is maintained. This state is maintained until N > 1,500 rpm, i.e., the start of travel. Therefore, the minimum steering force is generated prior to vehicle travel.

When the vehicle starts to travel and N > 1,500 rpm, the counter 100a is incremented. The maximum value of the counter 100a corresponds to the engine revolution N. A steering force is generated in accordance with the value of the counter 100a. Therefore, with an increase in vehicle velocity, the steering force is increased and the steering wheel feels heavier. When N ≦ 1,500 rpm again, the counter 100a is decremented to "0". As a result, the steering force is gradually decreased from the value corresponding to the value N to the minimum value.

FIG. 3d shows a solenoid current in this embodiment. The solenoid current is controlled in accordance with an engine revolution on and after time t6 when a vehicle start is determined. The solenoid current is kept at the maximum value before time t6. Therefore, during an idling period, the solenoid current becomes maximum and the steering wheel feels lightest. On the contrary, during the maximum velocity period, the solenoid current becomes minimum and hence the steering wheel feels heaviest.

The case wherein no vehicle velocity signal is supplied has been described above. If a vehicle velocity signal is supplied, the flow advances from step 3 to steps 14 and 15. Therefore, the steering force is controlled in accordance with a vehicle velocity. If a vehicle velocity higher than 0 km/h is detected, "1" is set in the flag FSPEED in step 14. With this operation, even if the vehicle velocity subsequently becomes zero, assist control at 0 km/h is performed in step 15 through step 4.

As has been described above, according to the present invention, after the engine revolution becomes a first predetermined value or more, and subsequently becomes a second predetermined value or less and a third predetermined value or more, the steering force is controlled in accordance with the engine revolution. That is, the invention utilizes three predetermined values of engine rotation as follows:

(a) The first predetermined value: This is the rotation value when controlling by the engine rotation starts.
(b) The second predetermined value: This is a value greater than the engine rotation value just when the engine is started after its idling state.
(c) The third predetermined value: This is an upper limit value at the idling state.

In summary, the relationship among the above three predetermined values in order of their magnitudes is:

The second value > The third value > The first value.

As a result, the steering force can be kept minimum even if the engine revolution increases during a warm-up operation prior to vehicle travel, and hence the steering wheel can be made to feel lightest during this period.

In this embodiment, for example, a hardware counter in the CPU 100 is used as the counter 100a. However, a software counter incorporated in the memory 101 may be used. In addition, an external memory may be used as the memory 101.

What is claimed is:

1. A method for controlling a steering force of a power steering system of a vehicle having an engine with a variable engine revolution, said method comprising the steps of:

a) measuring the velocity of said vehicle and generating a vehicle velocity signal having a non-zero value when the vehicle is moving and having a zero value when the vehicle is stationary;

b) controlling the steering force in accordance with the velocity of said vehicle only when said vehicle velocity signal has said non-zero value; and c) controlling the steering force in accordance with the engine revolution when said vehicle velocity signal has said zero value after said engine revolution becomes less than a first predetermined value after said engine revolution became greater than a second predetermined value, said second predetermined value being greater than said first predetermined value, wherein a minimum steering force is supplied until said engine revolution becomes greater than a third predetermined value, said third predetermined value being greater than said first predetermined value and less than said second predetermined value.

2. The method defined by claim 1 wherein said second predetermined value is greater than said engine revolution immediately after said engine is started and said third predetermined value is the engine revolution at an idling state.

* * * * *

UNITED STATES PATENT AND TRADEMARK OFFICE
CERTIFICATE OF CORRECTION

PATENT NO. : 5,064,014

DATED : 11/12/91

INVENTOR(S) : Ishizaka et al

It is certified that error appears in the above-identified patent and that said Letters Patent is hereby corrected as shown below:

col. 03, line 14  delete "$N < 1,200$"  insert --$N \leq 1,200$--

Signed and Sealed this

Twentieth Day of April, 1993

*Attest:*

MICHAEL K. KIRK

*Attesting Officer*  *Acting Commissioner of Patents and Trademarks*